F. W. STEVENS.
SHEET CUTTING MACHINE.
APPLICATION FILED SEPT. 1, 1909.

965,489.

Patented July 26, 1910.
2 SHEETS—SHEET 1.

Witnesses:

Inventor
Frederick W. Stevens.
By G. L. Cragg
Atty

F. W. STEVENS.
SHEET CUTTING MACHINE.
APPLICATION FILED SEPT. 1, 1909.
965,489.
Patented July 26, 1910.
2 SHEETS—SHEET 2.
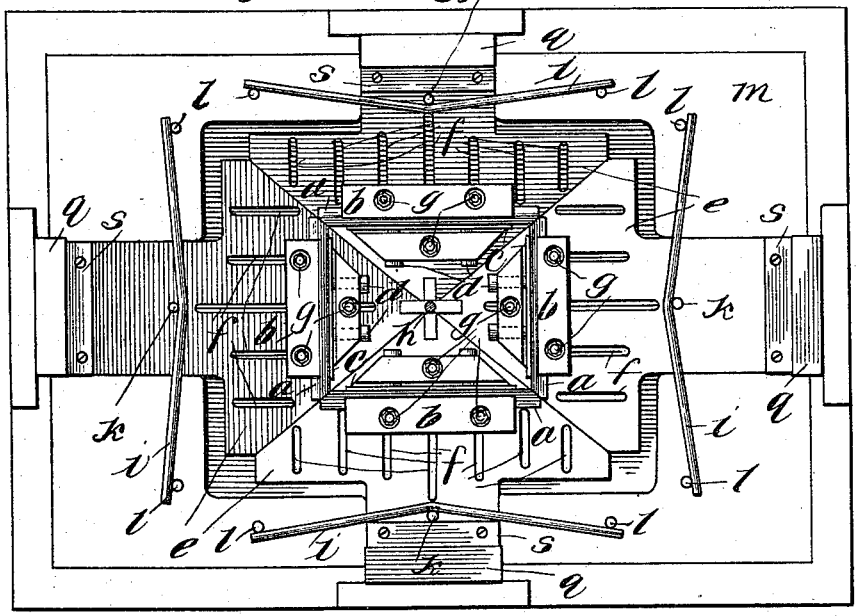
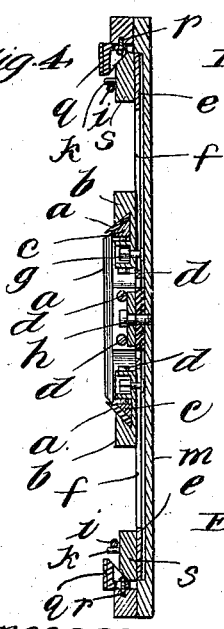
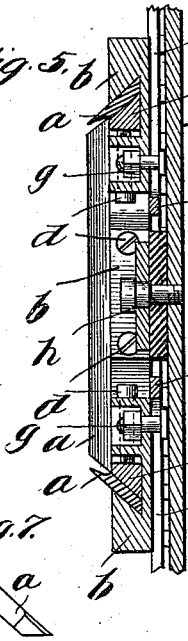
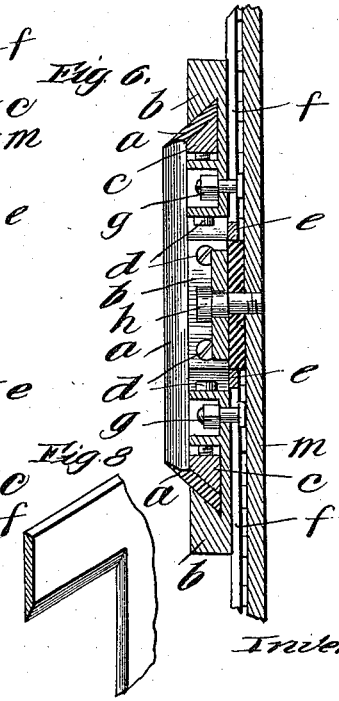
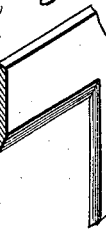
Witnesses:
Inventor
Frederick W. Stevens,
By

UNITED STATES PATENT OFFICE.

FREDERICK W. STEVENS, OF JOLIET, ILLINOIS.

SHEET-CUTTING MACHINE.

965,489.  Specification of Letters Patent.  Patented July 26, 1910.

Application filed September 1, 1909. Serial No. 515,598.

*To all whom it may concern:*

Be it known that I, FREDERICK W. STEVENS, a citizen of the United States, residing at Joliet, in the county of Will and State of Illinois, have invented a certain new and useful Improvement in Sheet-Cutting Machines, of which the following is a full, clear, concise, and exact description, reference being had to the accompanying drawings, forming a part of this specification.

My invention relates to apparatus for forming openings in sheet material, and finds important use in forming beveled openings in picture mats.

In practicing my invention, I employ knives having cutting edges suited to the dimensions of the openings to be formed in the sheet material, these cutting edges having extensions at the ends of the knives that are oblique with respect to the cutting edges.

In the preferred embodiment of the invention, chucks are provided for the knives, which chucks are so mounted that they may be moved together, during which movement the sheet material and knives are pressed together, to cause the long cutting edges of the knives to cut through the sheet material, the adjacent oblique extensions of the long cutting edges of the different knives being gradually brought together and contacting when the long cutting edges have passed through the sheet material, whereby these oblique cutting edge portions are adapted naturally to cut the corners in the openings in the sheet material.

In the preferred embodiment of the invention, the chucks which carry the knives are so pressed by spring mechanism that the chucks will separate when no pressure is being exerted between the knives and the sheet material that is to be cut, mechanism, responsive to pressure that is exerted when the knives are passing through the sheet material, being employed to effect the simultaneous mutual approach of the chucks containing the knives, whereby the results which have been described are secured.

I will explain my invention more fully by reference to the accompanying drawings, showing the preferred embodiment thereof, in which—

Figure 1:
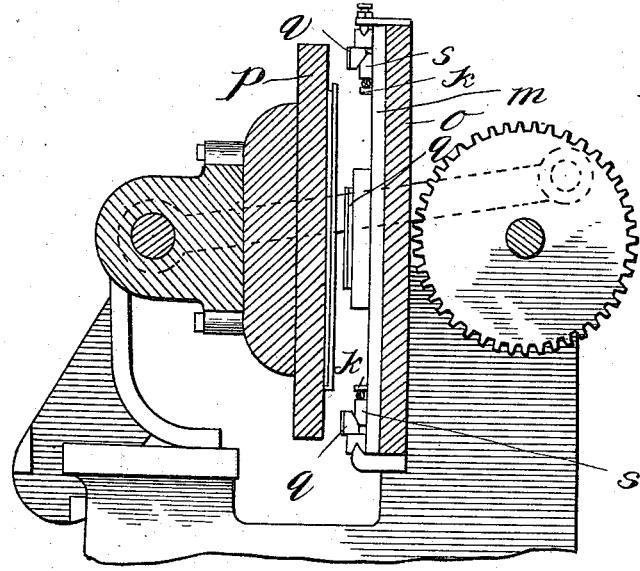
Figure 2:
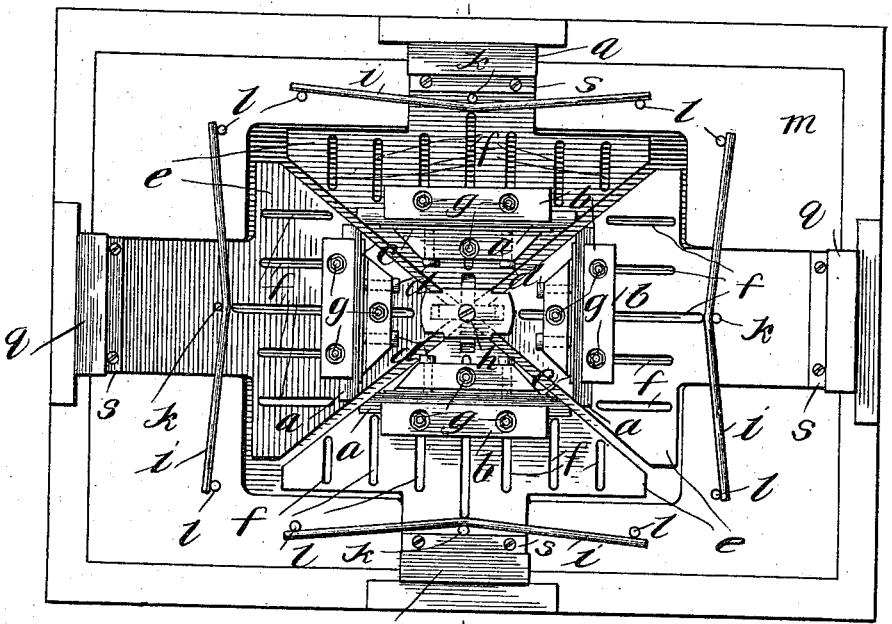

Figure 1 is a sectional elevation of a machine constructed in accordance with my invention. Fig. 2 is an elevation of the cutting mechanism constructed in accordance with the invention, this view showing the cutting mechanism in its idle position. Fig. 3 shows the cutting mechanism of Fig. 2 after it has been operated. Fig. 4 is a view in cross-section on line 4 4 of Fig. 2. Fig. 5 is an enlargement of a part of the view shown in Fig. 4. Fig. 6 is a view similar to Fig. 5, with the exception that the parts are shown in the position they occupy after the mechanism has been operated to do the cutting. Fig. 7 is end view of the knife blade. Fig. 8 is a perspective view showing a part of the beveled opening produced by the cutting mechanism.

Like parts are indicated by similar characters of reference throughout the different figures.

In the embodiment of the invention shown, mechanism is illustrated whereby rectangular beveled openings may be formed in sheet material, but I do not limit myself to the formation of rectangular openings. There are as many sheet material-cutting knives $a$ as there are sides to the openings to be formed. In the present instance, there are four such knives, which are mounted in suitable chuck bodies $b$ at angles preferably of forty-five degrees to the chuck bodies, the chuck bodies being provided with knife-retaining blocks $c$ which are pressed against the knives by means of clamping screws $d$. The base $e$ for each chuck body is desirably separately formed from such chuck body, in order that chuck bodies of different sizes may be separably connected with the same chuck bases, so that in case the chuck bodies are not adapted to the selected knives, chuck bodies of other sizes may be substituted. Each chuck base has a plurality of slots $f$ therein, three of which are shown as being in register with openings provided in the associate chuck body, whereby clamping bolts $g$ may be employed separably to secure the chuck body and base together. In the embodiment of the invention illustrated, I have shown each chuck base as being provided with seven slots $f$, the bolts $g$ passing through the middle three slots. In the case of a given chuck, if the knife that is to be substituted for the knife illustrated, is too long for such chuck body, then a larger chuck body may be substituted, in which case additional slots $f$ and additional clamping bolts $g$ may be employed to hold the larger chuck body and the chuck base together.

Adjacent chuck bases $e$ move with respect to each other in directions that are at right-angles, the chuck bases moving toward and from a common point where the screw $h$ is located.

The chucks, together with the knives, are caused to occupy normally idle positions, by means of spring devices, which, in the embodiment of the invention shown, are in the form of spring rods $i$, each being in engagement at its intermediate portion with the inside of a pin $k$ provided upon a chuck base and in engagement at its ends with the pins $l$ located upon the frame-work or foundation $m$ of the mechanism of my invention. The spring rods being thus engaged with the pins, withdraw the chucks and the knives carried thereby to their outermost positions. The chucks are desirably advanced toward the central point $h$ when the sheet material is to be cut by the knives carried thereby. This simultaneous inward movement of the chucks and knives is desirably accomplished through the same general mechanism that effects pressure between the knives and the sheet material to be cut.

In practicing my invention, the foundation or support $m$ may be located in a press that is analogous to a Gordon or similar printing press and in the place usually occupied by a printing form. The sheet material to be cut may be fed by hand upon the platen of the press in a manner similar to the way paper is fed into the Gordon type of press. I have indicated a support $o$ for the frame-work or foundation $m$ and a platen $p$ for supporting the sheet material that is to be cut, and I will not further describe the elements $o$ and $p$ as presses containing the same are very well known. It is known that after the sheet material is placed upon the platen, the press operating mechanism brings the platen into parallel relation with the supporting structure $o$, after which the platen is moved in a direction at right-angles to the supporting part $o$ and toward the same, in order that the sheet material may have pressure exerted thereupon. In the preferred embodiment of my invention, the platen not only supports the sheet material that is to be cut and presses the same upon the cutting edges of the knives $a$, but the outer portions of the platen are adapted to press upon cam blocks $q$ that are movably mounted upon the foundation element $m$ in such a way that said cam blocks may be moved in the direction in which the platen is moving toward the support $o$, screws $r$ holding the cam blocks $q$ upon the frame-work $m$ while permitting movement of said cam blocks transversely to the plane of the frame-work or foundation $m$. The cam blocks $q$ engage with cam blocks $s$ provided on the bases of the chucks, and when the cam blocks $q$ are moved inwardly, the cam blocks $s$ are moved inwardly, the cam blocks $s$ in their inward movement carrying with them the knife-carrying chucks. In the preferred embodiment of the invention, the simultaneous inward movements of the chucks and the knives carried thereby, commence when the platen presses the sheet material that is to be cut upon the long cutting edges of the knives. A continued pressure of the platen is required in order to force the cutting edges of the knives through the sheet material, which continued pressure effects the mutual approach of the chucks and cutting knives until the knives have penetrated the sheet material and formed the desired opening therein. It will be apparent that these movements of the knives cause their cutting edges to be passed obliquely through the sheet material. The cutting edges provided upon the ends of the knives being oblique with respect to the long cutting edges, are so located that when the knives are brought together, the contiguous oblique end cutting edges of the knives will be in contact, so that the beveled edges surrounding the opening cut into the sheet material will be completely formed, the corner portions being nicely trimmed by the oblique end cutting edges of the knives, all as will be apparent by an inspection of the drawings.

When the platen is withdrawn, the spring rods $i$ withdraw the chucks and the knives so that they may occupy their initial position preparatory to cutting an opening in a fresh sheet of material.

It will be seen that I have provided a machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the planes containing the longitudinal and oblique cutting edges of the knives slanting toward each other, the knives being adapted to penetrate the material to be cut when the members of the press are moved toward each other, and mechanism operated by pressure exerted between said members for forcing the mutual approach of said knives when relative movement between said members is caused, the adjacent oblique cutting edges of the cutting knives being adapted substantially to contact when forced inward.

It will also be seen that I have provided a machine for cutting sheet material including a plurality of cutting blades having longitudinal cutting edges and cutting edges oblique with respect to the longitudinal cutting edges and forming continuations thereof, in combination with means for effecting relative transverse movement between the material to be cut and the cutting blades and movement along the plane of the material to be cut.

It will be understood that I have particularly described the preferred embodiment of my invention, in order that one way of practicing my invention might be thoroughly understood. It is obvious, however, that many changes may be made in the embodiment of the invention particularly shown and described, without departing from the spirit of the invention, and I do not, therefore, wish to be limited to the precise details of construction shown, nor do I wish to be limited to the peculiar form of press mechanism described, in practicing the invention.

Having thus described my invention, I claim as new and desire to secure by Letters Patent the following:—

1. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the planes containing the longitudinal and oblique cutting edges of the knives slanting toward each other, the knives being adapted to penetrate the material to be cut when the members of the press are moved toward each other, and mechanism operated by pressure exerted between said members for forcing the mutual approach of said knives when relative movement between said members is caused, the adjacent oblique cutting edges of the cutting knives being adapted substantially to contact when forced inward.

2. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the planes containing the longitudinal and oblique cutting edges of the knives slanting toward each other, the knives being adapted to penetrate the material to be cut when the members of the press are moved toward each other, and mechanism intervening between said members for forcing the mutual approach of said knives when relative movement between said members is caused, the adjacent oblique cutting edges of the cutting knives being adapted substantially to contact when forced inward.

3. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the planes containing the longitudinal and oblique cutting edges of the knives slanting toward each other, the knives being adapted to penetrate the material to be cut when the members of the press are moved toward each other, and mechanism operated by pressure exerted between said members for forcing the mutual approach of said knives when relative movement between said members is caused.

4. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the planes containing the longitudinal and oblique cutting edges of the knives slanting toward each other, the knives being adapted to penetrate the material to be cut when the members of the press are moved toward each other, and mechanism intervening between said members for forcing the mutual approach of said knives when relative movement between said members is caused.

5. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the knives being adapted to penetrate the material to be cut when the members of the press are moved toward each other, and mechanism operated by pressure exerted between said members for forcing the mutual approach of said knives when relative movement between said members is caused, the adjacent oblique cutting edges of the cutting knives being adapted substantially to contact when forced inward.

6. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the knives being adapted to penetrate the material to be cut when the members of the press are moved toward each other, and mechanism intervening between said members for forcing the mutual approach of said knives when relative movement between said members is caused, the adjacent oblique cutting edges of the cutting knives being adapted substantially to contact when forced inward.

7. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the knives being adapted to penetrate the material to be cut when the members of the press are moved toward each other, and mechanism operated by pressure exerted between said members for forcing the mutual approach of said knives when relative movement between said members is caused.

8. A machine for cutting sheet material including a press that has two members and mechanism for effecting the mutual approach of said members and their separation, one of said members serving to hold the sheet material that is to be cut while the other of said members holds a plurality of relatively movable knives each of which has a longitudinal cutting edge and a cutting edge at each end oblique with respect to the longitudinal cutting edge and forming continuations thereof, the knives being adapted to penetrate the material to be cut when the members of the press are moved toward each other, and mechanism intervening between said members for forcing the mutual approach of said knives when relative movement between said members is caused.

9. A machine for cutting sheet material including a press that has two members and mechanism for effecting the mutual approach of said members and their separation, one of said members serving to hold the sheet material that is to be cut while the other of said members holds a plurality of relatively movable knives whose cutting edges face the aforesaid member and which are forced into the material to be cut when relative movement between said members toward each other is caused, and mechanism operated by pressure exerted between said members for forcing the mutual approach of said knives when relative movement between said members is caused.

10. A machine for cutting sheet material including a press that has two members and mechanism for effecting the mutual approach of said members and their separation, one of said members serving to hold the sheet material that is to be cut while the other of said members holds a plurality of relatively movable knives whose cutting edges face the aforesaid member and which are forced into the material to be cut when relative movement between said members toward each other is caused, and mechanism intervening between said members for forcing the mutual approach of said knives when relative movement between said members is caused.

11. A machine for cutting sheet material including a plurality of cutting blades each having a longitudinal cutting edge and two cutting edges at its ends oblique with respect to the longitudinal cutting edge and forming continuations thereof, each of said blades being held to have the plane including its cutting edges slanting, in combination with means for effecting relative transverse movement between the material to be cut and the cutting blades and the mutual approach of the cutting blades when cutting the sheet material, the adjacent oblique cutting edges of the cutting blades being adapted substantially to engage each other, the planes including the cutting edges of the different knives slanting toward each other.

12. A machine for cutting sheet material including a plurality of cutting blades each having a longitudinal cutting edge and two cutting edges at its ends oblique with respect to the longitudinal cutting edge and forming continuations thereof, each of said blades being held to have the plane including its cutting edges slanting, in combination with means for effecting relative transverse movement between the material to be cut and the cutting blades and the mutual approach of the cutting blades when cutting the sheet material, the planes including the cutting edges of the different knives slanting toward each other.

13. A machine for cutting sheet material including a plurality of cutting blades each having a longitudinal cutting edge and two cutting edges at its ends oblique with respect to the longitudinal cutting edge and forming continuations thereof, each of said blades being held to have the plane including its cutting edges slanting, in combination with means for effecting relative transverse movement between the material to be cut and the cutting blades and the mutual approach of the cutting blades when cutting the sheet material, the adjacent oblique cutting edges of the cutting blades being adapted substantially to engage each other.

14. A machine for cutting sheet material including a plurality of cutting blades each having a longitudinal cutting edge and two cutting edges at its ends oblique with respect to the longitudinal cutting edge and forming continuations thereof, in combination with means for effecting relative transverse movement between the material to be cut and the cutting blades and also for effecting the mutual approach of the adjacent ends of the cutting blades, the movement of the blades in planes that slope toward each other when cutting the sheet material.

In witness whereof, I hereunto subscribe my name this 30th day of August A. D., 1909.

FREDERICK W. STEVENS.

Witnesses:
G. L. CRAGG,
L. G. STROH.